United States Patent Office 2,995,703
Patented Aug. 8, 1961

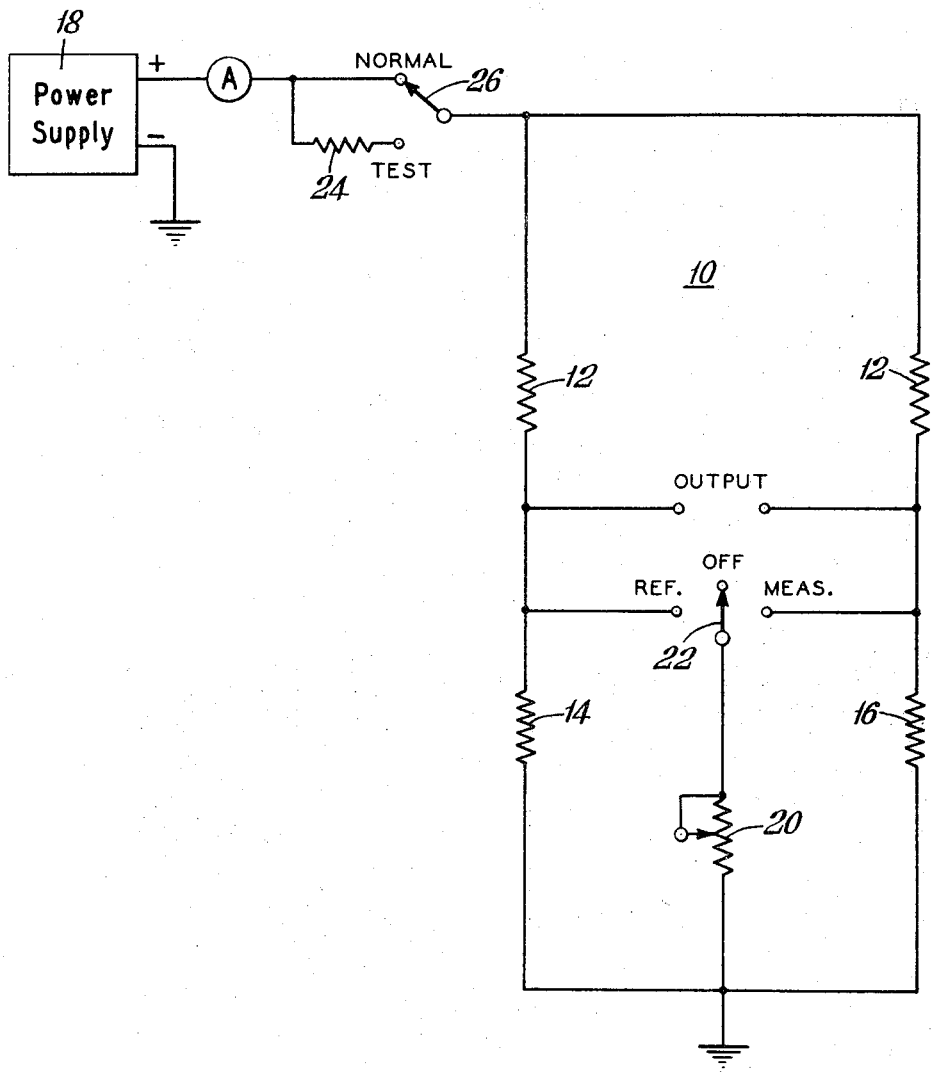

2,995,703
THERMISTOR MATCHING
Louis J. Rogers, Nitro, W. Va., assignor to Union Carbide Corporation, a corporation of New York
Filed Mar. 25, 1958, Ser. No. 723,871
8 Claims. (Cl. 324—62)

This invention relates to novel method and apparatus for matching the electrical characteristics of thermistor sensing elements in thermal conductivity detection apparatus.

Variations between the thermal conductivities of gases are widely used parameters in gas analyzing instruments. One of the most widely used and commercially important applications of such measurements at the present time is in the chromatographic analyzer. Chromatographic apparatus for measuring the difference between the thermal characteristics of gases is disclosed and claimed in copending application Serial No. 609,160 filed September 11, 1956, by S. B. Spracklen et al. and entitled "Vapor Fraction Analyzer." As pointed out therein the measurement is proportional to the difference between the thermal characteristics (i.e., the combined thermal conductivity and heat capacity characteristics) of a carrier gas and a binary mixture of a sample effluent and carrier gas.

The accuracy and sensitivity of chromatographic analyzers has been steadily improved to the point where analyzers capable of measurements in the parts per million range are now being produced. The sensitivity of such instruments may be such that a difference in temperature between the sensing elements of as little as 0.01° C. will give full scale deflection on a recorder. When it is understood that a commonly used recorder chart is divided into 200 spaces, it can be seen that each space represents a temperature difference between the elements of 0.00005° C.

In order to provide maximum sensitivity of measurement, the thermistor is commonly used because it has a negative temperature coefficient of resistance approximately ten times higher than the positive coefficients available in standard wire components. No two thermistors are exactly alike in electrical characteristics, however, and the unbalance created by such a mismatching becomes apparent in an irregularity of the base line of the recorder under conditions not involving actual measurement. Such an irregularity may extend over several divisions of a recorder chart and is a serious threat to accuracy when high sensitivity measurements are involved. While the irregularity may be corrected by bridge adjustments at any particular operating point, the fact that the slope of the curve of temperature versus coefficient of resistance of one thermistor may be slightly different from that of another creates an unbalance in the output of the bridge even though the same change may affect both thermistors equally—for example, a variation in bridge voltage.

Therefore, the primary object of the present invention is to provide simple means for the precise matching of thermal sensitive elements.

Other objects, features, and advantages of the present invention are to provide more accurate means for sensitive measurements of gas components; to provide such means capable of simple adjustment under varying conditions of operation; and to achieve the above objects through the use of simple switching means.

The above objects are achieved by providing in a bridge circuit having at least two thermistor sensing elements, variable resistance means, switch means for connecting said variable resistance means in parallel with either of the thermistor sensing elements, means for equally varying the environment of the thermistor sensing elements, and means for measuring the output voltage.

The invention may be best explained by reference to the single figure of the drawing which is an electric circuit diagram of apparatus embodying the invention. As there shown, a Wheatstone bridge measuring circuit 10 is provided containing fixed resistances 12, reference thermistor 14, and measuring thermistor 16. Voltage is supplied to the bridge from power supply 18, and the output of the bridge is fed to a sensing device such as a recorder. Variable shunting resistance 20 is provided between the common point of thermistors 14 and 16 and shunting switch 22. It can thus be seen that by moving switch 22 to the "Ref." or "Meas." position, resistance 20 may be shunted across either thermistor.

Test resistor 24 is provided in the power supply circuit for insertion by test switch 26 when desired.

The effect of shunting resistor 20 is to lower the sensitivity of the thermistor shunted. The effect on instrument accuracy is negligible, however, and is greatly offset by increased stability of the base line.

As an example of the operation of the apparatus of the invention, a typical matching procedure will be described. With switch 26 in the "Normal" position, switch 22 set at "Off," and thermistors 14 and 16 exposed to the same thermal conditions, the recorder connected to the bridge output is allowed to run while the base or "zero" line is obtained. Switch 26 is then turned to its "Test" position to insert resistor 24 into the power supply line and lower the voltage input to the bridge. If the thermistors are perfectly matched, no change of position will occur in the base line. Such a condition not existing, however, the base line will be offset in one direction. Switch 22 is then switched to either the "Ref." or "Meas." position so as to shunt either thermistor 14 or 16 by resistor 20. Resistor 20 is arbitrarily set to any desired setting, for example, to 10,000 ohms. The base line is once more observed while switch 26 is switched from the "Normal" to the "Test" position. If the base line offset increases, the wrong thermistor was shunted and switch 22 must be turned to the other position. If the offset decreases, the correct thermistor was shunted but a lower value of resistance 20 is needed. If the offset direction reverses, the correct thermistor was shunted, but the value of resistance 20 must be increased. These steps are repeated until a variation in input voltage by switch 26 causes little or no change in the output of bridge 10. At this point the bridge may be considered truly balanced and a significant increase in stability will have been achieved with little or no decrease in sensitivity of measurement. In actual operation, the fluctuations of the base line are easily reduced to 20 percent of their original magnitude. If the "reference" thermistor is the one shunted, there is no change in sensitivity whatsoever. If the "measuring" thermistor is shunted, the decrease in sensitivity is so slight that it is not normally apparent within the readability of the instrument.

The term "environment" as used in this description and appended claims refers to the physical and electrical conditions affecting the thermistor response. It should be understood that variation of the bridge input voltage is only one way in which equal changes of the thermistor environment may be effected. Other methods, for example, would be to change the temperature of the metal block in which the thermistor cells are embedded, or possibly to equally change the flow rate of the gases in each cell.

As a specific example of the operation of the invention, a Wheatstone bridge having fixed resistance values of 500 ohms each was provided in conjunction with a chromatographic analyzer. Matched thermistors made up the reference and measuring cells of the analyzer and were incorporated into the bridge as its remaining two legs. These thermistors had resistance values of 8000 ohms at room temperature but when placed in a 50° C. chamber and self-heated above that temperature, approximated 600 ohms each. The carrier gas used was pure hydrogen and the analysis was made for 100 p.p.m. ethyl ether in ethylene. The direct current voltage applied across the bridge was 6 volts. Prior to correction, the base line showed an instability amounting to a recorded variation of ± 1.8 percent of the full scale reading. Shunting resistances were then inserted in the manner described above until no base line offset was observed. This condition was attained with a shunting resistor of 15,000 ohms. With this resistance remaining in the circuit, the recorded base line instability was reduced to ± 0.25 percent, an improvement factor amounting to approximately seven to one.

While the invention has been described with particular emphasis on its application to chromatographic analysis, it is not to be understood as so limited. The invention is equally capable of use in any measuring system requiring the matching of multiple thermistor elements for accurate analyses.

What is claimed is:

1. In a bridge measuring circuit having a power supply and at least one thermistor sensing element in two opposing arms of the bridge circuit, the improvement comprising variable resistance means; switching means in series with said variable resistance means for selectively parallel-connecting said variable resistance means to each of said thermistor sensing elements; means for equally varying the environment of said thermistor sensing elements; and means for measuring the output voltage of said bridge.

2. In a bridge measuring circuit having a power supply and at least one thermistor sensing element in two opposing arms of the bridge circuit, the improvement comprising variable resistance means; switching means in series with said variable resistance means for selectively parallel-connecting said variable resistance means to each of said thermistor sensing elements; means for selectively varying the voltage supplied to said bridge measuring circuit; and means for measuring the output voltage of said bridge.

3. In the bridge measuring circuit of a chromatographic analyzer having a power supply and at least one thermistor sensing element in two opposing arms of the bridge circuit, the improvement comprising variable resistance means; switching means in series with said variable resistance means for selectively parallel-connecting said variable resistance means to each of said thermistor sensing elements; means for equally varying the environment of said thermistor sensing elements; and means for measuring the output voltage of said bridge.

4. In the bridge measuring circuit of a chromatographic analyzer having a power supply and at least one thermistor sensing element in two opposing arms of the bridge circuit, the improvement comprising variable resistance means; switching means in series with said variable resistance means for selectively parallel-connecting said variable resistance means to each of said thermistor sensing elements; means for selectively varying the voltage supplied to said bridge measuring circuit; and means for measuring the output voltage of said bridge.

5. A method for matching the electrical characteristics of at least two thermistor sensing elements comprising shunting one of said thermistor elements with variable resistor means; equally varying the environment of each of said thermistors; measuring the difference in the electrical characteristics of said thermistors due to said variation of said environment; adjusting said variable resistor means to minimize said difference in said electrical characteristics.

6. A method for matching the electrical characteristics of at least two thermistor sensing elements comprising shunting one of said thermistor elements with variable resistor means; equally varying the temperature of each of said thermistors; measuring the difference in the electrical characteristics of said thermistors due to said variation of said temperature; adjusting said variable resistor means to minimize said difference in said electrical characteristics.

7. A method for matching the electrical characteristics of at least two thermistor sensing elements comprising shunting one of said thermistor elements with variable resistor means; equally varying the voltage across each of said thermistors; measuring the difference in the electrical characteristics of said thermistors due to said variation of said voltage; adjusting said variable resistor means to minimize said difference in said electrical characteristics.

8. A method for matching the electrical characteristics of the thermistor sensing elements of a chromatographic analyzer comprising shunting one of said thermistor elements with variable resistor means; equally varying the voltage across each of said thermistors; measuring the difference in the electrical characteristics of said thermistors due to said variation of said voltage; adjusting said variable resistor means to minimize said difference in said electrical characteristics.

References Cited in the file of this patent

UNITED STATES PATENTS

| | | |
|---|---|---|
| 2,530,184 | Statham | Nov. 14, 1950 |
| 2,623,206 | Hornfeck | Dec. 23, 1952 |
| 2,711,650 | Weisheit | June 28, 1955 |